(12) United States Patent
Perthold et al.

(10) Patent No.: US 8,787,927 B2
(45) Date of Patent: Jul. 22, 2014

(54) APPARATUS AND METHOD FOR FREQUENCY-SELECTIVE OCCUPANCY DETECTION

(75) Inventors: Rainer Perthold, Weisendorf (DE); Dieter Weninger, Markt Erlbach (DE); Holger Schlegel, Nuremberg (DE)

(73) Assignee: Innovationszentrum fuer Telekommunikationstechnik GmbH IZT, Erlangen (DE)

( * ) Notice: Subject to any disclaimer, the term of this patent is extended or adjusted under 35 U.S.C. 154(b) by 0 days.

(21) Appl. No.: 13/098,188

(22) Filed: Apr. 29, 2011

(65) Prior Publication Data

US 2011/0263211 A1 Oct. 27, 2011

Related U.S. Application Data (63) Continuation of application No. PCT/EP2009/007417, filed on Oct. 15, 2009.

(30) Foreign Application Priority Data

Oct. 31, 2008 (DE) .................. 10 2008 054 070

(51) Int. Cl.
 *H04W 74/00* (2009.01)
 *H04W 72/00* (2009.01)
 *H04B 17/00* (2006.01)

(52) U.S. Cl.
 USPC .................. 455/455; 455/450; 455/67.13

(58) Field of Classification Search
 USPC ............................................ 455/67.13
 See application file for complete search history.

(56) References Cited

U.S. PATENT DOCUMENTS

| | | | | |
|---|---|---|---|---|
| 4,689,760 | A | * | 8/1987 | Lee et al. ............... 370/526 |
| 5,583,784 | A | * | 12/1996 | Kapust et al. .......... 702/77 |
| 2007/0064844 | A1 | * | 3/2007 | May ...................... 375/346 |
| 2007/0263566 | A1 | * | 11/2007 | McHenry et al. ........ 370/329 |

(Continued)

OTHER PUBLICATIONS

Chiang, R.I.C.; Rowe, G.B.; Sowerby, K.W.; , "A Quantitative Analysis of Spectral Occupancy Measurements for Cognitive Radio," Vehicular Technology Conference, 2007. VTC2007-Spring. IEEE 65th , vol., No., pp. 3016-3020, Apr. 22-25, 2007 doi: 10.1109/VETECS.2007.618 URL: http://ieeexplore.ieee.org/stamp/stamp.jsp?tp=&arnumber=4213046&isnumber=4212428.*

(Continued)

*Primary Examiner* — Temesgh Ghebretinsae
*Assistant Examiner* — Devan Sandiford
(74) *Attorney, Agent, or Firm* — Michael A. Glenn; Perkins Coie LLP (57) ABSTRACT

An apparatus for frequency-selective occupancy detection of a channel in a frequency band includes a detector for detecting a receive spectrum in the frequency band, a provider for providing node frequencies, a determiner for determining node level values, a determiner for determining the threshold curve and a comparer. The provider provides the node frequencies for a threshold curve with respect to a noise floor in the frequency band. The determiner determines the node level values at the node frequencies based on receive level values of the receive spectrum. The determiner determines the threshold curve in the frequency band based on the provided node frequencies and the node level values at the node frequencies. The comparer compares a current power of the receive level values in the channel with a reference power in the channel predetermined by the threshold curve to detect occupancy or non-occupancy of the channel depending on the comparison.

24 Claims, 9 Drawing Sheets

(56) References Cited

U.S. PATENT DOCUMENTS

2009/0207735 A1* 8/2009 Ben Letaief et al. ......... 370/237
2009/0212991 A1* 8/2009 Smith et al. ...................... 342/29
2010/0075704 A1* 3/2010 McHenry et al. ............. 455/509

OTHER PUBLICATIONS

Terzija, V.V.; , "Improved recursive Newton-type algorithm for frequency and spectra estimation in power systems," Instrumentation and Measurement, IEEE Transactions on , vol. 52, No. 5, pp. 1654-1659, Oct. 2003 doi: 10.1109/TIM.2003.817152 URL: http://ieeexplore.ieee.org/stamp/stamp.jsp?tp=&arnumber=1240185&isnumber=27804.*

Spaulding A D et al: "On the Definition and Estimation of Spectrum Occupancy"; Aug. 1, 1977; IEEE Transactions on Electromagnetic Compatibility, IEEE Service Center, New York, NY, US, vol. EMC-19, Nr. 3, pp. 269-280, XP011164795 ISSN: 0018-9375.

Matthias Wellens et al: "Evaluation of Spectrum Occupancy in Indoor and Outdoor Scenario in the Context of Cognitive Radio"; Aug. 1, 2007; 2nd International Conference on Cognitive Radio Oriented Wireless Networks and Communications, (CROWNCOM 2007), IEEE, Piscataway, NJ, USA, pp. 420-427, XP031276085 ISBN: 978-1-4244-0814-6.

Nicolae Cotanis: "New metrics for RF spectrum occupancy"; Jul. 10, 2008; 4th European Conference on Circuits and Systems for Communications, IEEE, Piscataway, NJ, USA, pp. 266-269, XP031315037 ISBN: 978-1-4244-2419-1.

John T MacDonald et al: "Spectrum Occupancy Estimation in Wireless Channels with Asymmetric Transmitter Powers"; Aug. 1, 2007; 2nd International Conference on Cognitive Radio Oriented Wireless Networks and Communications, (CROWNCOM 2007), IEEE; Piscataway, NJ, USA, pp. 245-249, XP031276054 ISBN: 978-1-4244-0814-6.

Agilent E3238 HF ALE Intercept Solution (35688E—AL9); Product Overview; Agilent Technologies, Revised Jul. 17, 2008, Printed in USA, Aug. 26, 2008. 5989—1794EN; 12 pages; Retrieved online Jun. 23, 2009 from url: <http://cp.literature.agilent.com/litweb/pdf/5989-1794EN.pdf>.

English Translation of the Int'l Preliminary Report on Patentability, mailed May 6, 2011, inrelated PCT patent application No. PCT/EP2009/007417; 6 pages.

Int'l Search Report (with translation), mailed Jan. 27, 2010, in related PCT patent application No. PCT/EP2009/007417; 15 pages.

* cited by examiner

|    | start (MHz) | stop (MHz) | bandwidth | ignore |
|----|-------------|------------|-----------|--------|
| 1  | 88,100000   | 107,500000 | 50 kHz    | ☐ |
| 2  | 100,000000  |            | 100 kHz   | ☐ |
| 3  | 90,000000   | 91,000000  |           | ☑ |
| 4  |             |            |           | ☐ |
| 5  |             |            |           | ☐ |
| 6  |             |            |           | ☐ |
| 7  |             |            |           | ☐ |
| 8  |             |            |           | ☐ |
| 9  |             |            |           | ☐ |
| 10 |             |            |           | ☐ |
| 11 |             |            |           | ☐ |
| 12 |             |            |           | ☐ |
| 13 |             |            |           | ☐ |
| 14 |             |            |           | ☐ |
| 15 |             |            |           | ☐ |
| 16 |             |            |           | ☐ |
| 17 |             |            |           | ☐ |
| 18 |             |            |           | ☐ |
| 19 |             |            |           | ☐ |
| 20 |             |            |           | ☐ |
| 21 |             |            |           | ☐ |
| 22 |             |            |           | ☐ |
| 23 |             |            |           | ☐ |
| 24 |             |            |           | ☐ |
| 25 |             |            |           | ☐ |
| 26 |             |            |           | ☐ |
| 27 |             |            |           | ☐ |
| 28 |             |            |           | ☐ |
| 29 |             |            |           | ☐ |
| 30 |             |            |           | ☐ |
| 31 |             |            |           | ☐ |
| 32 |             |            |           | ☐ |
| 33 |             |            |           | ☐ |
| 34 |             |            |           | ☐ |
| 35 |             |            |           | ☐ |
| 36 |             |            |           | ☐ |
| 37 |             |            |           | ☐ |
| 38 |             |            |           | ☐ |
| 39 |             |            |           | ☐ |
| 40 |             |            |           | ☐ |

FIGURE 8A

| | center frequency MHz | bandwidth kHz | occupancy % | maximum level dBm | average level dBm | relative accuracy % |
|---|---|---|---|---|---|---|
| 1 | 88,150000 | 50,000 | 10,7 | -80,1 | -88,5 | 27,9 |
| 2 | 88,200000 | 50,000 | 100,0 | -74,3 | -75,2 | 7,7 |
| 3 | 88,250000 | 50,000 | 17,6 | -79,6 | -87,9 | 20,7 |
| 4 | 88,500000 | 50,000 | 100,0 | -78,8 | -79,2 | 7,7 |
| 5 | 88,800000 | 50,000 | 95,0 | -82,8 | -83,2 | 9,4 |
| 6 | 88,850000 | 50,000 | 64,0 | -74,8 | -81,1 | 12,2 |
| 7 | 88,900000 | 50,000 | 100,0 | -66,9 | -68,9 | 7,7 |
| 8 | 88,950000 | 50,000 | 58,1 | -75,8 | -81,8 | 12,1 |
| 9 | 89,100000 | 50,000 | 100,0 | -80,1 | -80,4 | 7,7 |
| 10 | 89,400000 | 50,000 | 100,0 | -81,0 | -81,4 | 7,7 |
| 11 | 89,700000 | 50,000 | 86,6 | -77,4 | -80,0 | 10,4 |
| 12 | 89,750000 | 50,000 | 100,0 | -76,1 | -77,5 | 7,7 |
| 13 | 91,050000 | 50,000 | 13,1 | -72,2 | -81,8 | 26,7 |
| 14 | 91,350000 | 50,000 | 13,6 | -75,9 | -81,6 | 22,3 |
| 15 | 91,400000 | 50,000 | 100,0 | -67,8 | -69,3 | 7,7 |
| 16 | 91,450000 | 50,000 | 18,3 | -74,7 | -80,9 | 21,5 |
| 17 | 92,250000 | 50,000 | 27,0 | -68,1 | -78,1 | 19,4 |
| 18 | 92,300000 | 50,000 | 100,0 | -61,7 | -63,5 | 7,7 |
| 19 | 92,350000 | 50,000 | 42,1 | -67,7 | -76,9 | 13,9 |
| 20 | 92,850000 | 50,000 | 87,3 | -69,5 | -75,3 | 12,6 |
| 21 | 92,900000 | 50,000 | 100,0 | -61,5 | -63,2 | 7,7 |
| 22 | 92,950000 | 50,000 | 88,7 | -70,0 | -76,1 | 12,0 |
| 23 | 93,700000 | 50,000 | 82,5 | -81,5 | -82,3 | 29,1 |
| 24 | 94,450000 | 50,000 | 0,2 | -84,9 | -91,2 | - |
| 25 | 94,500000 | 50,000 | 59,7 | -77,1 | -83,4 | 23,7 |
| 26 | 94,550000 | 50,000 | 0,2 | -85,2 | -92,4 | - |
| 27 | 95,500000 | 50,000 | 83,1 | -81,5 | -83,4 | 16,6 |
| 28 | 95,750000 | 50,000 | 100,0 | -83,4 | -87,8 | 90,6 |
| 29 | 95,800000 | 50,000 | 0,9 | -71,8 | -75,2 | 7,7 |
| 30 | 95,850000 | 50,000 | 1,2 | -83,6 | -86,1 | 76,6 |
| 31 | 96,000000 | 50,000 | 2,0 | -83,5 | -85,3 | 67,9 |
| 32 | 96,350000 | 50,000 | 18,3 | -78,3 | -86,1 | 19,2 |

FIGURE 8B

APPARATUS AND METHOD FOR FREQUENCY-SELECTIVE OCCUPANCY DETECTION

CROSS-REFERENCE TO RELATED APPLICATIONS

This application is a continuation of International Application No. PCT/EP2009/007417, filed Oct. 15, 2009, which is incorporated herein by reference in its entirety, and additionally claims priority from German Application No. DE 10 2008 054 070.6, filed Oct. 31, 2008, which is incorporated herein by reference in its entirety.

BACKGROUND OF THE INVENTION

The present invention relates to an apparatus and method for detecting occupancy of a channel within a frequency band, and in particular to a frequency-selective occupancy measurement based on a threshold determined from the noise floor.

In order to be able to perform frequency-selective spectrum occupancy measurement of radio channels, for example, exact determination of a threshold is necessitated, above the value of which the channel to be measured is classified as currently active, or below which the channel is classified as currently inactive.

Further, by frequency-selective spectrum occupancy measurement of radio channels, it can also be determined which radio channels are occupied to what extent over time and whether the channel parameters, such as center frequency or maximum field strength are maintained.

The threshold can, for example, simply be firmly set to a power level value measured, for example, in dBm, for the period of the measurement. The disadvantage of this method is that the receive spectrum (power spectral density=PSD) changes significantly in parts when the receiver (e.g. the antenna, bandwidth, etc.) changes. Thereby, it can become necessitated to readjust the threshold every time.

It is also possible to determine the threshold adaptively from the current receive spectrum, for example by determining the noise floor and adding an offset in decibel (dB) to the same, so that the so-called noise riding threshold (NRT) is obtained. However, it is a disadvantage of this method that in real situations, due to the structure of the receiver, receive spectra are to be measured which are not flat but, for example, arranged in a rising manner towards higher frequencies or also in a falling manner. In this case, the radio channels are classified as active or inactive, depending on their position in the receive spectrum, which results in measurement errors.

It follows that there is a need for an apparatus and a method allowing the occupancy measurement of a radio channel to be performed frequency-selectively, flexibly and largely independent from the hardware.

SUMMARY

According to an embodiment, an apparatus for frequency-selective occupancy detection of a channel in a frequency band may have: a means for detecting a receive spectrum in the frequency band; a means for providing node frequencies for a threshold curve with respect to a noise floor in the frequency band; a means for determining node level values at the node frequencies based on the receive level values of the receive spectrum; a means for determining the threshold curve in the frequency band based on the provided node frequencies and on the node level values at the node frequencies; and a means for comparing a current power of the receive level values in the channel with a reference power in the channel predetermined by the threshold curve, for determining, in dependence on the comparison, an occupancy or non-occupancy of the channel.

According to another embodiment, a method for frequency-selective occupancy detection of a channel in a frequency band, may have the steps of: detecting a receive spectrum in the frequency band; providing node frequencies for a threshold curve with respect to a noise floor in the frequency band; determining node level values at the node frequencies based on receive level values of the receive spectrum; determining the threshold curve in the frequency band based on the provided node frequencies and on the node level values at the node frequencies; and comparing a current power of receive level values in the channel with a reference power in the channel predetermined by the threshold curve, in order to detect an occupancy or non-occupancy of the channel based on the comparison.

Another embodiment may have a computer program having a program code for performing the inventive method when the computer program runs on a computer.

It is the basic idea of the present invention to first determine frequencies for nodes (node frequencies) lying within the frequency domain to be measured, and subsequently to determine node level values for the respective node frequencies. The calculation of the node level values can be made by means of receive level values of the receive signal, wherein the receive level values are detected by a means (e.g. an input). By interpolating the node level values, the threshold curve can be obtained. This threshold curve generally depends on the frequency and adapts flexibly to the respective noise floor. With the help of the threshold curve, it is possible to measure the occupancy of a channel frequency-selectively, which can be performed, for example, by comparing the current power of the receive level values (the PSD signal) with the reference power determined by the threshold curve, in order to classify the channel as being occupied or not occupied depending on the comparison.

Contrary to the conventional methods, the suggested method does not only use one value but also several values for determining the NRT. These values that will be referred to as NRT nodes below, consist of a tuple of frequencies (node frequencies) and power level (node level values). Thereby, the frequency interval of adjacent NRT nodes can be constant or become smaller towards higher frequencies or larger towards larger frequencies. This means that the frequencies of the NRT nodes can be adjusted freely based on several parameters. The power level of the NRT nodes, however, is determined from the current receive spectrum or a combination of past receive spectra and the current receive spectrum (memory). The NRT nodes calculated in this manner can then be interpolated based on the frequencies of the FFT lines (FFT=fast Fourier transformation) of the receive spectrum in an appropriate manner, for determining the flexibly adapted threshold curve (noise riding threshold). In order to be able to perform occupancy measurement therewith, finally the power of the channel to be measured can be compared to the power of the respective frequency domain of the threshold curve.

Thus, the operating mode of the algorithm underlying the inventive method is divided into two parts:
(a) determination and adaptation of NRT nodes (node frequencies);
(b) calculation of NRT (node level values).

First, determination and adaptation of the NRT nodes will be discussed in more detail.

The following configuration type of NRT nodes has proved to be useful. A division of the overall frequency domain to be examined into frequency groups is performed. The change or increase in size of the frequency group width starting from lower frequencies can be configured by an initial frequency (startfreq), an initial frequency group width (startbw), a terminal frequency (endfreq) and a growth factor (geofac). The growth factor describes a geometric series and determines the increase in size of the frequency group width. Therewith, the following frequencies are obtained for the NRT raster:

$$freq(i) = startbw \cdot \frac{1 - geofac^i}{1 - geofac} + startfreq, \ i = 1, \ldots, n. \quad (1)$$

An estimation of the number n of frequencies freq(i) with startfreq≤freq(i)≤endfreq can be performed as follows:

$$\left\lfloor \frac{\log_{10}\left(1 - \left(\frac{endfreq - startfreq}{startbw}\right) \cdot (1 - geofac)\right)}{\log_{10}(geofac)} \right\rfloor + 1 = n. \quad (2)$$

If geofac=1 applies, the frequency group width remains constant, while the frequency group width becomes smaller for geofac<1 and grows for geofac>1. Based on empirical experiments, the value for the growth factor geofac≈1.01 has proved to be useful. The frequencies of the NRT nodes node (i) are then exactly in the center of adjacent frequencies of the NRT raster:

$$node(i) = \frac{freq(i) + freq(i + 1)}{2}, \ i = 1, \ldots, n - 1 \quad (3)$$

node(i) now represents all frequency lines f for which freq(i) f≤f<freq(i+1) applies.

In many cases, (receive) spectra have to be measured, within which the frequency of the first FFT line does not coincide with a frequency of the NRT raster. As a consequence, regions of the receive spectrum at the end or at the beginning are not adequately represented by NRT nodes. However, it is one aim that the NRT nodes are optimally adapted to the current receive spectrum. This is possible by shifting the NRT raster locally as little as possible towards the top or towards the bottom within the frequency, so that the nearest NRT raster frequency coincides with the frequency of the first FFT line (initial frequency) in the spectrum. In order to be able to also represent the end of the spectrum (terminal frequency) well by an NRT node, the globally adjusted growth factor (geofac) can be slightly modified locally. Optionally, also the initial frequency group width can be varied in the respective (receive) spectrum. If, for example, the last NRT raster frequency (last node frequency) within the receive spectrum is closer to the last FFT of the receive spectrum, the growth factor expands slightly. If, however, the following NRT raster frequency outside the receive spectrum is closer to the frequency of the last FFT line, the growth factor shrinks slightly. For determining the modified growth factor, for example the Newton method can be used. Thereby, the following is set:

$$f(geofac_n) == psdStartbw \cdot \frac{1 - geofac_n^k}{1 - geofac_n} + psdStartfreq - psdEndfreq \quad (4)$$

The first derivation off reads:

$$f'(geofac_n) == \quad (5)$$
$$-psdStartbw \cdot \frac{k \cdot geofac_n^{k-1}}{1 - geofac_n} + psdStarbw \cdot \frac{1 - geofac_n^k}{(1 - geofac_n)^2}.$$

The Newton method can be used for an iterative determination of the nulls of f, wherein the iteration sequence for geofac is given by:

$$geofac_{n+1} = geofac_n - \frac{f(geofac_n)}{f'(geofac_n)} \quad (6)$$

and based on n=0,1,2, . . . an approximation is obtained for the locally modified growth factor (here, n refers merely to the iteration step and not to the number of frequencies as in equation (1)). geofac$_o$ is the given globally adjusted growth factor as used, for example, in equation 1. The value k is set to the desired number of NRT raster frequencies within the receive spectrum −1. The value psdStartbw represents the first frequency group width within the spectrum. psdStartfreq (initial frequency) or psdEndfreq (terminal frequency) are the frequencies of the first or last FFT line in this (receive) spectrum. Since the Newton method has a square convergence, for example seven iterations are sufficient for sufficient accuracy. However, depending on the desired accuracy, the number of iteration steps can vary, so that, for example, sufficient accuracy already exists after two, three, four, five or also six iterations. It is also possible that more than seven iterations are used for increasing the accuracy further. For example, eight, nine, ten or more than twelve iterations can be used.

With the growth factor(geofac) determined and locally modified in this manner, the NRT raster for the frequency domain of this receive spectrum is calculated again by equation 1. Finally, two additional NRT nodes are placed onto the first and last FFT line, which represent the region of the first FFT line to the first regular NRT node or last regular NRT node to last FFT line. In this way, the receive spectra obtain their own local NRT raster, which is as close as possible to the global NRT raster as given by equation 1.

The following statements deal with an appropriate calculation of the threshold (node level values) at the NRT nodes.

In further embodiments, at first, successive receive level values are averaged, and the averaging result is used as the new receive level average for determining the node level values.

In embodiments, the node level values can be determined based on the associated receive level values. For example, a histogram can be formed from the same. The node level value can be determined, for example, by a lower power level limit in the histogram or can alternatively have a certain distance to the lower power level limit.

Further, the means for determining level values can be implemented to correct the node level values, such that a difference of adjacent node level values lies within a maximum tolerance width (i.e. within ±10%, ±20% or ±50%). The correction can also be made such that a previously determined node level value is integrated in the determination of a current node level value such that heavily varying level values are attenuated.

In further embodiments, the means for determining the node level values comprises a leaky integrator, for example for obtaining attenuation.

After the node level values have been determined, additionally, interpolation can be performed for determining the threshold curve between the node level values at the node frequencies. The interpolation can, for example, include a linear interpolation or a cubic interpolation or a constrained cubic interpolation.

Finally, in embodiments, the means for determining the threshold curve is implemented to add an offset when determining the threshold curve, so that the threshold curve has an offset distance to the noise floor.

Embodiments of the present invention comprise the following advantages or the presented method is particularly effective in the following features:

Flexible and automatic adaptation to existing hardware is possible.

Equation 1 enables usage of an NRT raster adapting itself well to real circumstances. Hence, the bandwidths of the emitters tend to increase towards higher frequencies.

Further, elimination of static signals to a large extent can be obtained with as good an approximation of the noise floor as possible.

A very good estimation of the noise floor over the frequency is obtained, wherein everything that seems to be an artificial signal is ignored (the curve tends to be flat).

Statistical signals of artificial origin, e.g. spurious signals, are below the curve.

Low calculation complexity is enabled.

Implementation is structured simply and hence well scalable.

BRIEF DESCRIPTION OF THE DRAWINGS

Embodiments of the present invention will be detailed subsequently referring to the appended drawings, in which.

DETAILED DESCRIPTION OF THE INVENTION

Regarding the following description, it should be noted that in the different embodiments, the same or equal functional elements have the same reference numbers and hence the description of these functional elements in the different embodiments illustrated below are interchangeable.

Figure 1:
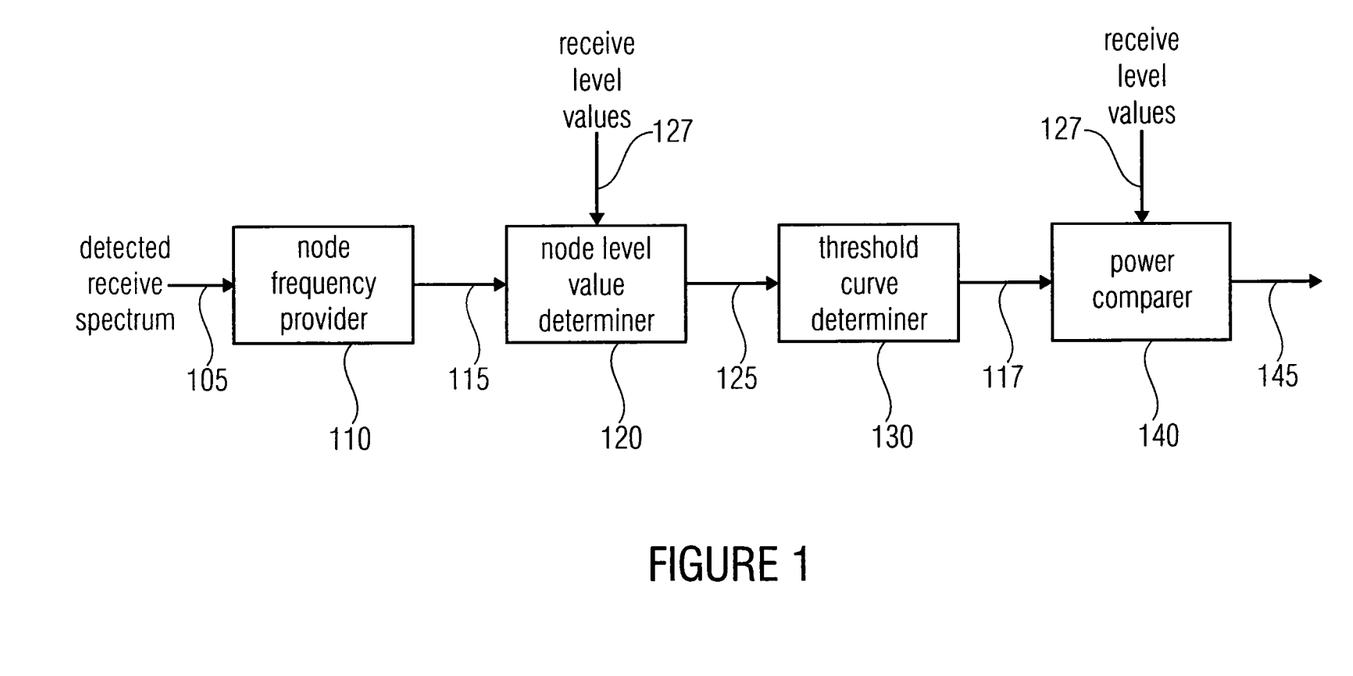
FIG. 1 is a schematic illustration of an apparatus according to an embodiment of the present invention.

FIG. 1 shows a schematic illustration of an embodiment of the present invention. The apparatus for frequency-selective occupancy detection of a channel in a frequency band comprises a means 105 for detecting a receive spectrum in the frequency band, a means 110 for providing node frequencies 115, a means 120 for determining node level values 125, a means 130 for determining the threshold curve 117 and a means 140 for comparing.

The inventive apparatus serves for frequency-selective occupancy detection of a channel in a frequency band, wherein first a receive spectrum is detected by a means 105 (e.g. an input) and supplied to means 110. Means 110 provides the node frequencies 115 for a threshold curve 117 with respect to a noise floor in the frequency band. Means 120 determines the node level values 125 at the node frequencies 115 based on the receive level values 127 of the receive spectrum. Means 130 determines the threshold curve 117 in the frequency band based on the provided node frequencies 115 and the node level values 125 at the node frequencies 115. Means 140 compares a current power of the receive level values 127 in the channel with a reference power in the channel predetermined by the threshold curve 117 to detect (or determine) occupancy or non-occupancy of the channel based on the comparison. The result can be output, for example, via an output 145. The output can include, for example, a percentage to which the channel is occupied, so that the channel can be considered to be occupied at a value of significantly above 50% (e.g. 80% or 90%).

Figure 2:
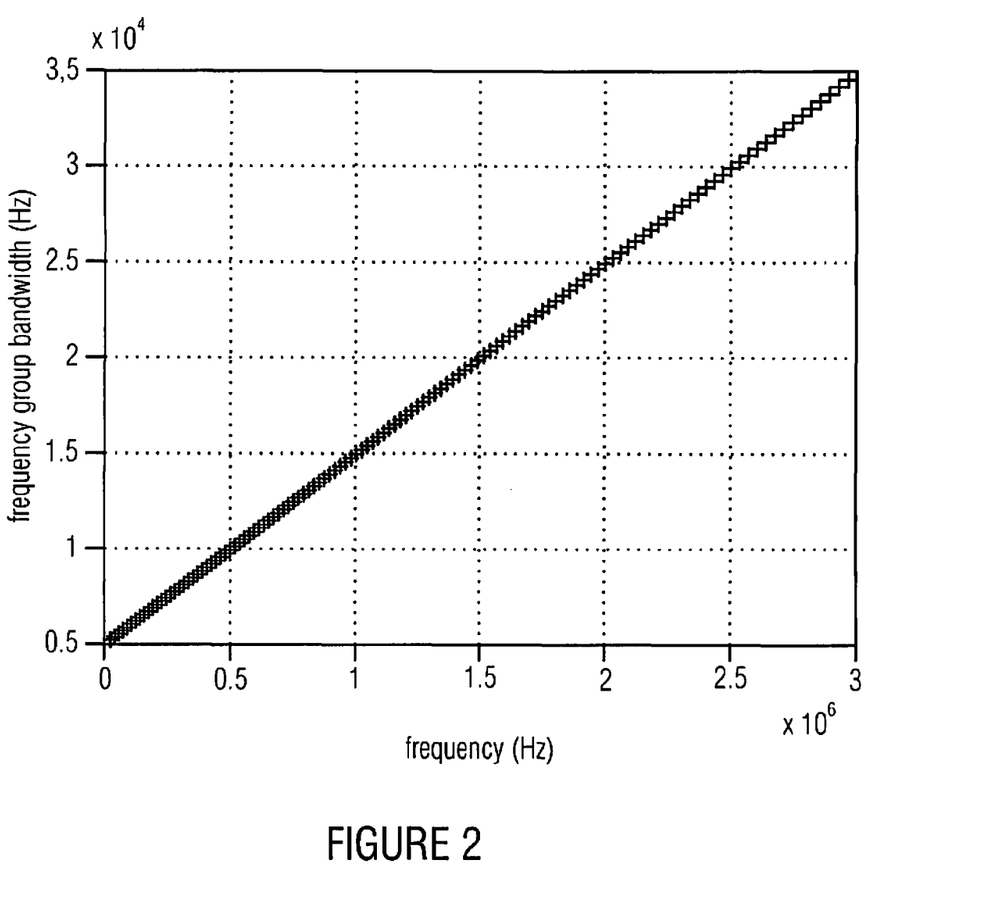
FIG. 2 is an illustration of the increase in frequency group bandwidth with the frequency.

FIG. 2 shows an exemplary dependency of the frequency group bandwidth (measured in Hertz) on the frequency (measured in Hertz). Thus, in the example shown, the ratio of frequency of the NRT node to NRT frequency group is illustrated, wherein the following values have been taken as examples for the parameters (in equations 1 to 3): geofac=1,01, startbw=5 kHz, startfreq=9 kHz and endfreq=3 MHz. The illustrated frequency group bandwidth results from equations 1 to 3 and increases monotonously with the frequency.

This is a consequence of the geometric series for the growth factor geofac higher than 1. The ratios are illustrated by crosses, so that a first cross is at the NRT node of (9+5)/2=7 kHz and the first frequency group bandwidth is 5 kHz.

Figure 3:
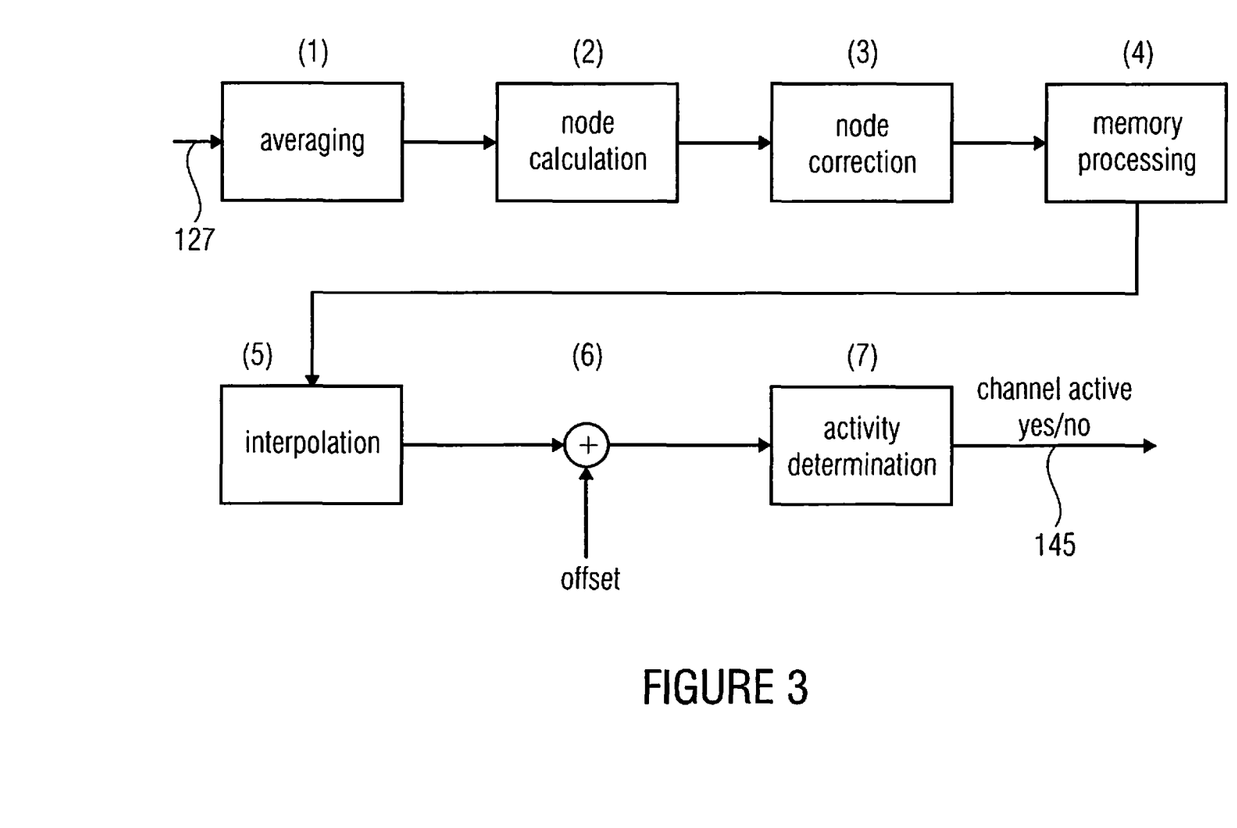
FIG. 3 is a schematic illustration for calculating the threshold curve.

FIG. 3 shows a calculation of the NRT as part (b) of the above-mentioned algorithm based on a block diagram. In the illustrated exemplary processing order, in this embodiment, processing steps (1) to (7) are performed per receive spectrum 127.

Thereby, the individual steps can, for example, include the following functions:

(1) Averaging:

Here, successive input spectra (PSD) that can include the receive level values 127 can be averaged. Averaging can, for example, be performed by forming the arithmetic average of successive spectra or based on averaging with memory, as it can, for example, be performed by a so-called leaky integrator. By averaging, it is possible to adjust the width of the noise floor in a variable manner, for example<1 dB.

(2) Node Calculation:

Within this processing block, where node level values 125 are determined, for example, a histogram of receive level values 127 having a resolution of −235 dBm to 20 dBm can be formed, for example, in 1 dB steps. Receive level values 127 below −235 dBm can, for example, be sorted in a first bucket of the histogram and values above 20 dBm can, for example, be sorted in a last bucket of the histogram. Depending on a freely adjustable parameter (noisefac), it is now possible to select how many buckets are to be discarded in order to determine the power level of these NRT nodes (node level values 125). This processing step is performed in the means 120 for determining node level values 125.

The number of discarded buckets can, for example, be determined by the following equation:

$$numBucketsSkip = \left\lfloor \frac{noisefac}{100} \cdot numBucketsNotZero \right\rfloor. \quad (7)$$

Further details regarding this processing step will be described in more detail with FIG. 4.

(3) Determining Node Corrections:

On account of various signal characteristics, it is possible that node level values 125 of the NRT nodes deviating from other existing node level values 125 are determined in the processing block (2). These extreme values can be readjusted by means of node correction. It would, for example, be possible to allow only a maximum deviation from the previous value. Node correction is an optional processing step or an optional processing stage.

(4) Memory Processing:

In this optional processing stage, node level values preceding in time can be integrated into the calculation of the current node level values (memory). One option for realizing this is given, for example, by a so-called leaky integrator. There are several implementations of the leaky integrator, wherein two of them will be illustrated here exemplarily:

(A) Simple leaky integrator: The leaky integrator generates some type of gliding average.

$$y(i) = \frac{x(i) + y(i-1) \cdot \omega}{\omega + 1}, \, i = 1, \ldots, n \quad (8)$$

wherein x(i) is the current level value and y(i) the averaged level value in the respective processing stage (iteration) numbered by "i". ω is the weighting factor and y(i−1)=x(1) is set for i=1 in the implementation.

(B) Advanced leaky integrator: This approach allows a varying saturation and decay behavior. If x(i)>y(i−1), then saturation will be effected by $$y(i) = \alpha \cdot y(i-1) + (1-\alpha) \cdot x(i) \quad (9)$$

The same can be configured by a time constant α. y(i−1)=x(1) is set for i=1 in the implementation. If x(i)≤y(i−1), then, a decay behaviour will be generated by $$y(i) = \beta \cdot y(i-1) + (1-\beta) \cdot x(i) \quad (10)$$

The decay behavior can be configured by a time constant β.

(5) Interpolation:

The level values 125 determined so far at the NRT nodes can now be interpolated based on the frequencies of the FFT lines of the current spectrum (receive level values 127). In embodiments for the NRT algorithm, three interpolation methods are possible: the linear, the cubic (so-called cubic spline) and the constrained cubic interpolation (so-called constrained cubic spline). Values to be interpolated that lie outside the NRT nodes are either linearly extrapolated from the two adjacent level values 125 at the NRT nodes, or the closest NRT node power level value is continued (slope 0). Further details will be described with FIGS. 5*a* and 5*b*.

(6) Offset Addition:

An offset in x dB can be added to the NRT calculated so far, forming the threshold curve 117, for fine-tuning. This is also referred to as offset and shifts the threshold curve 117 by the amount of the offset.

(7) Activity Detection:

Activity detection includes an estimation whether the channel can be classified as occupied/unoccupied. In this step, for example, the current power $P_{PSD}$ in the channel to be observed can be calculated and finally compared to a reference power $P_{NRT}$ in the channel averaged by the threshold curve 117. Both powers can, for example, be determined in a square manner (RMS=root mean square) and calculated as follows:

$$\hat{P}_{PSD_{RMS}} = \sqrt{\frac{1}{n} \sum_{i=k}^{n+k-1} \left(10^{\frac{x(i)_{PSD}}{10}} \cdot 0.001\right)^2} \quad (10a)$$

$$= \sqrt{\frac{1}{10^6 n} \sum_{i=k}^{n+k-1} \left(10^{\frac{x(i)_{PSD}}{5}}\right)};$$

$$\hat{P}_{NRT_{RMS}} = \sqrt{\frac{1}{n} \sum_{i=k}^{n+k-1} \left(10^{\frac{x(i)_{Thr}}{10}} \cdot 0.001\right)^2} \quad (11)$$

$$= \sqrt{\frac{1}{10^6 n} \sum_{i=k}^{n+k-1} \left(10^{\frac{x(i)_{Thr}}{5}}\right)}.$$

k is the first spectral value to be considered in this channel (receive level value 127). n is the total number of spectral values to be considered in this channel.

If:

$$\hat{P}_{PSD_{RMS}} > \hat{P}_{NRT_{RMS}} \quad (12)$$

applies, then the channel can be classified, for example, as active (occupied), otherwise not. Instead of the RMS, a simple adding up of the powers could be performed, such that the quantities $$\hat{S}_{PSD_{LinSum}} = \sum_{i=k}^{n+k-1} \left(10^{\frac{x(i)_{PSD}}{10}} \cdot 0.001\right), \quad (13)$$

$$\hat{S}_{NRT_{LinSum}} = \sum_{i=k}^{n+k-1} \left(10^{\frac{x(i)_{Thr}}{10}} \cdot 0.001\right) \quad (14)$$

are compared, and when $\hat{S}_{PSD_{LinSum}} > \hat{S}_{NRT_{LinSum}}$ applies, the channel is again classified (detected) as occupied.

After terminating activity determination, the result whether the channel is occupied yes or no can be output via output 145. Optionally, the output 145 can include a display.

Figure 4:
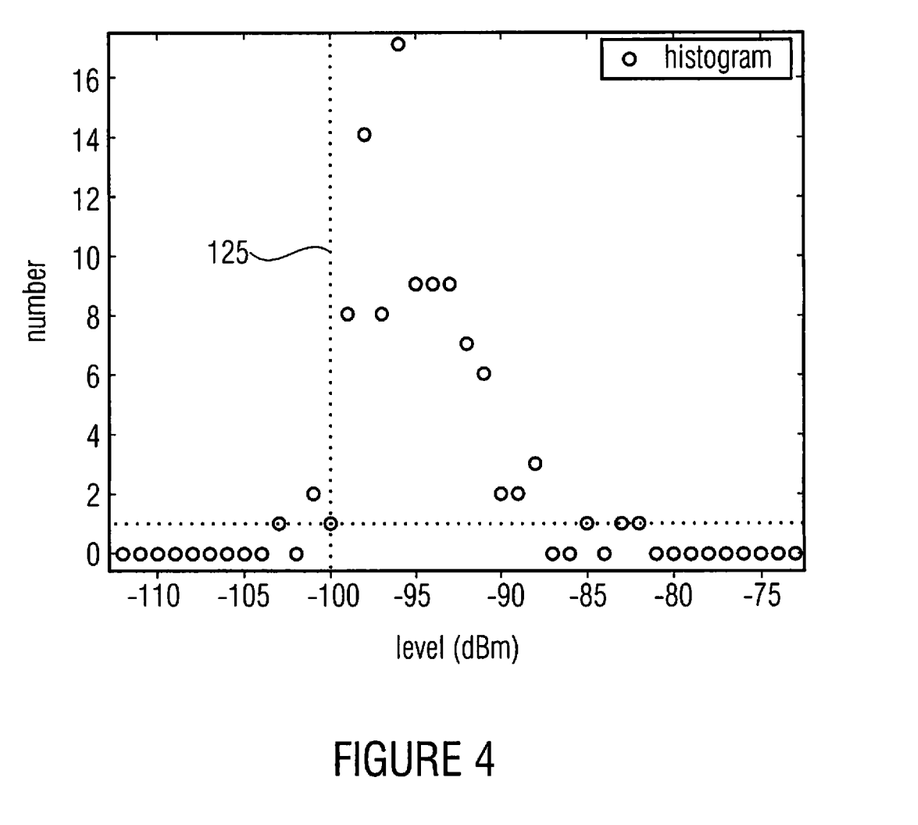
FIG. 4 is a histogram illustration for determining a node level value.

FIG. 4 shows an exemplary illustration for determining a level value 125 at one of the node frequencies 115. This illustration relates to equation 7, where noisefac=12 has been used, i.e. that 12% of the non-empty buckets starting from small values are discarded for determining the node level value 125 of this NRT node. In the case shown in FIG. 4, two buckets of all in all 18 non-empty buckets have been discarded, so that a power level of −100 dBm has been obtained as level value 125 of the node frequency 115. In detail, FIG. 4 shows a probability distribution of the level values, wherein the first level value differing from 0 is at −103 dBm, and the second level value differing from 0 is at −101 dBm. These two first level values (seen from low level values) are discarded in the given example on account of the assumed noisefac (12% of 18=2). The next level value differing from zero is at −100 dBm, wherein the level values of −103 dBm and −100 dBm each occur once in the histogram and the level value of −101 dBm occurs twice in the histogram. Subsequently, a fourth level value at −99 dBm occurs 8 times all in all, the fifth level value at −98 dBm 14 times, the sixth level value at −97 dBm 8 times and the seventh level value at −96 dBm all in all 17 times. The histogram continues up to the last level value differing from 0, which lies at −82 dBm and occurs once in the histogram. Above the level value of −82 dBm and below the level value of −106 dBm, no level values differing from 0 have been measured.

In further embodiments, the noisefac can be varied such that not only two level values are discarded, but that more or also less level values are discarded for determining the noise level value 125 for the node frequency 115.

Figure 5A:
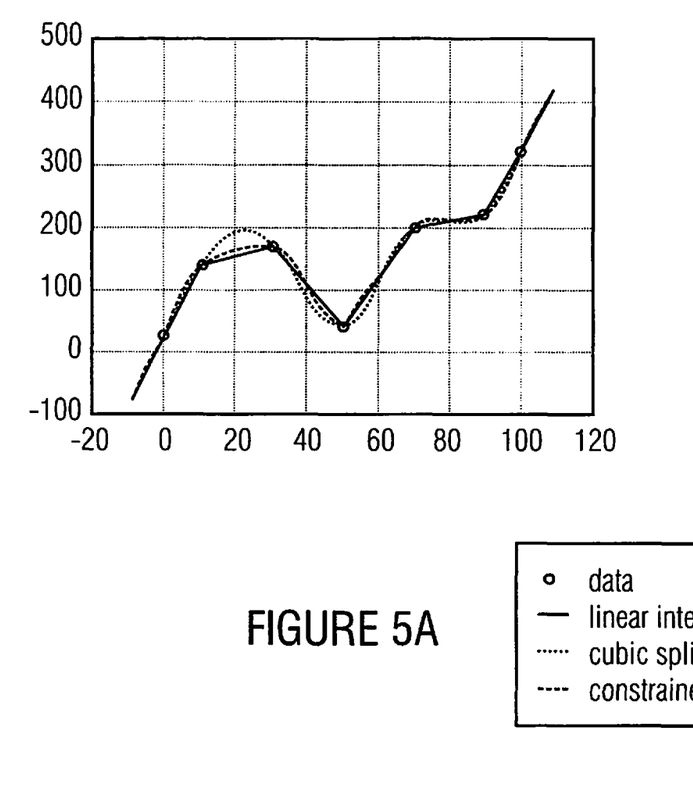
FIG. 5a,b is a comparison of possible interpolation types.
Figure 5B:
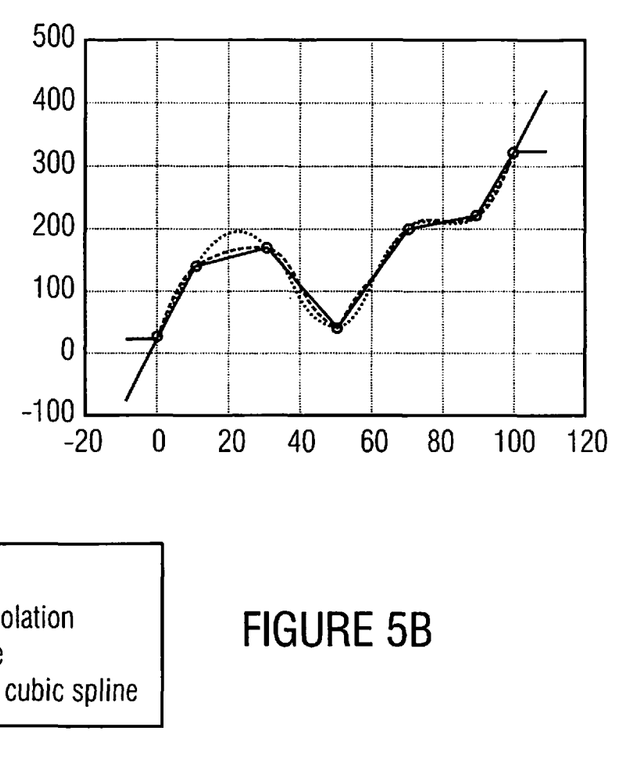

In FIG. 5a,b, the different interpolation methods that can be performed in the processing step (5) of FIG. 3 are compared with one another. All in all, three interpolation methods are compared with one another in FIG. 5a,b: wherein the closely dotted line represents a linear interpolation of data (indicated by circles), a thinly dotted line represents the cubic interpolation and a solid line represents the constrained cubic interpolation. All interpolations pass the data points illustrated as circles.

In the linear interpolation, straight lines connect the data points to each other. In the cubic and constrained cubic interpolation, the sections between two adjacent data points each are each illustrated by a cubic polynomial. In cubic interpolation, the cubic polynomials are fitted to one another such that both the first and the second derivation of cubic polynomials behave continuously at the data points, while in constrained cubic interpolation, the polynomial itself and the first derivations, but not the second derivations, behave continuously. Instead, in the constrained cubic interpolation, it has been assumed as an additional boundary condition that the value of the first derivation has a predetermined value at the data points. This predetermined value can be selected, for example, such that the tangents at the data points are as central as possible between the straight lines of the linear interpolation, so that the intermediate regions between the data points are as close as possible to the linear interpolation.

The difference between FIGS. 5a and 5b is how the interpolation is continued beyond the first and the last data point, i.e. for values <0 or for values >100. In FIG. 5a, linear extrapolation is performed, while in FIG. 5b, constant continuation of the graph (with a slope of zero) is performed. Thus, the illustrated curves indicate a threshold curve between the nodes.

One disadvantage of the cubic interpolation method (cubic spline) is the fact that, depending on the position of the nodes, strong "overshoots" can occur (see, for example, FIG. 5a at the value x=20). The linear interpolation does not have this problem, but has the disadvantage of generating corners at the nodes (non-continuous first derivation). The constrained cubic interpolation method tries to address both problems. On the one hand, the "overshoots" are eliminated as far as possible, while on the other hand, the corners are alleviated.

Figure 6:
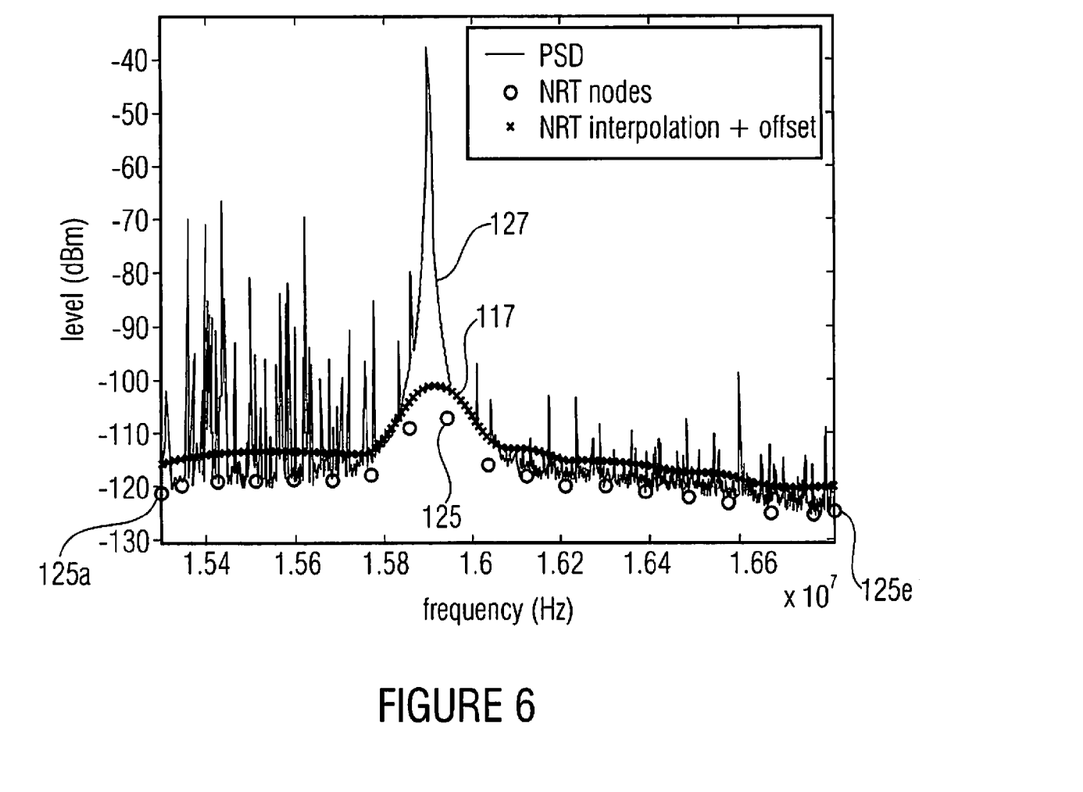
FIG. 6 is a calculated threshold curve in the short-wave range.
Figure 7:
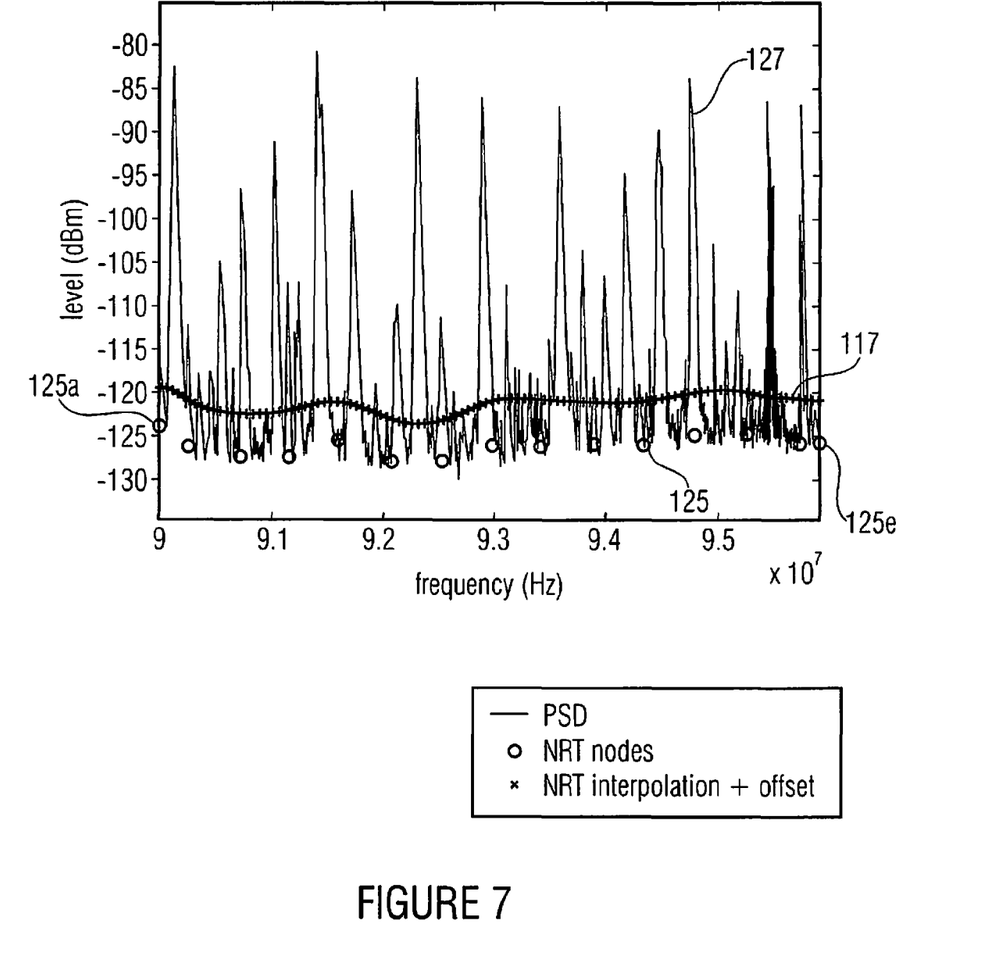
FIG. 7 is a calculated threshold curve in the VHF radio range.

FIGS. 6 and 7 show the mode of operation of the inventive NRT algorithm based on real signals in the short-wave or VHF radio range.

FIG. 6 shows a calculated NRT (threshold curve 117) in the short-wave range. Here, the receive level values 127 are shown, for which the NRT nodes or node level values 125 have been calculated to determine, finally, the threshold curve 117 (finally calculated NRT) from the same, which considers both interpolation and offset. The offset effects a shift of the threshold curve 117 towards higher level values (above the node level values 125). In FIG. 6, exemplarily, the following values have been assumed: center frequency: 16.0475 MHz, offset 5 dB, local geofac: 1.0068.

FIG. 7 shows an analogously calculated NRT for the ultra-short-wave radio range, wherein in FIG. 7, for example, the following values have been assumed: center frequency=92.975 MHz, offset=5 dB, local geofac=1.0022. Thus, FIG. 7 also shows a receive level 127, for which the node level values 127 have been calculated. Subsequently, the threshold curve 117 has been calculated by interpolation and adding the offset.

It can be seen both in FIG. 6 and in FIG. 7 that the first node frequency 115a and the last node frequency 115e are each at the beginning and the end of the frequency band, i.e. in FIG. 6, the first node frequency 115a is at approx. 15.3 MHz, and the last node frequency 115e at approx. 16.8 MHz. In between lies a total of 17 node frequencies 125. In a similar manner, in FIG. 7, the first node frequency 115a is at the beginning of the spectrum at approx. 90 MHz and the last node frequency 115e at the end point of the examined frequency band at approx. 96 MHz. In FIG. 7, a total of 13 further node frequencies 115 lie between these two end points.

In both figures it can be clearly seen how the threshold curve 117 (NRT) adapts to the noise floor, which presents a significant advantage of embodiments of the present invention.

Figure 8A:
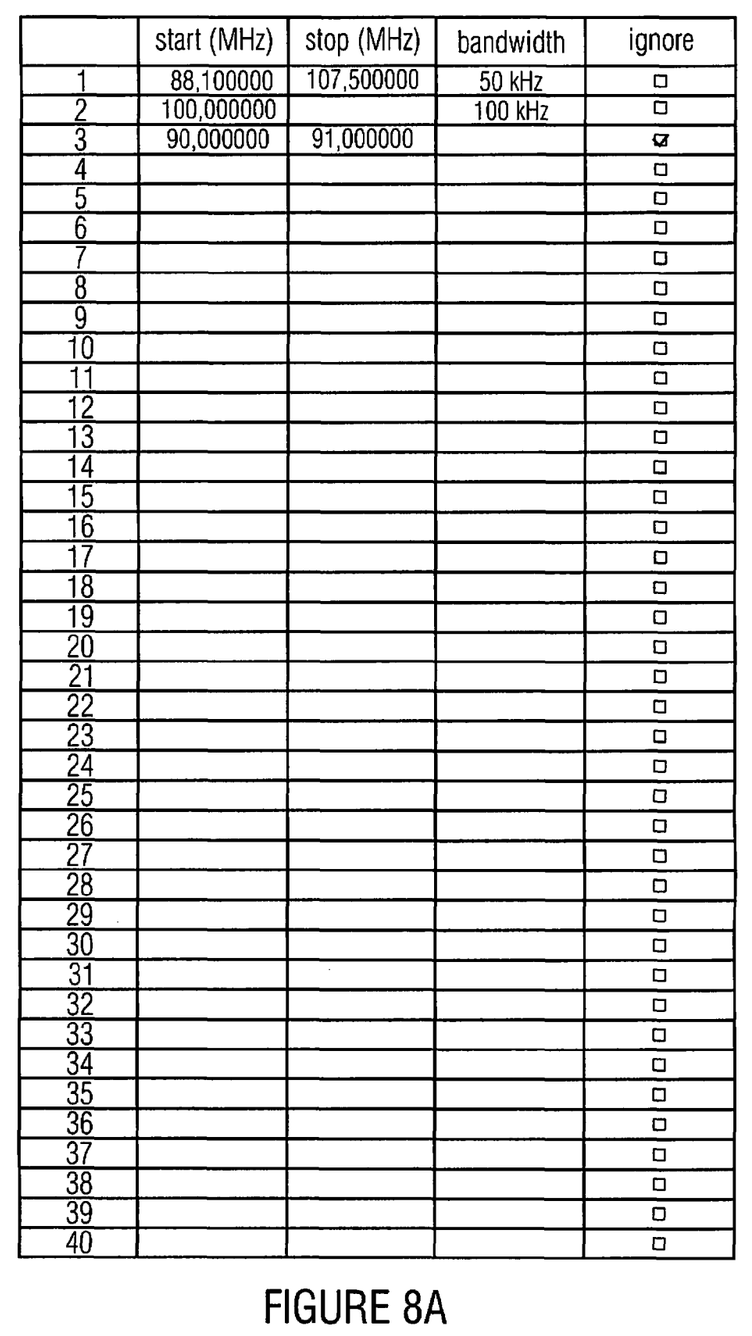
FIG. 8a,b is an example of a configuration of a spectral occupancy measurement and respective measurement results.
Figure 8B:
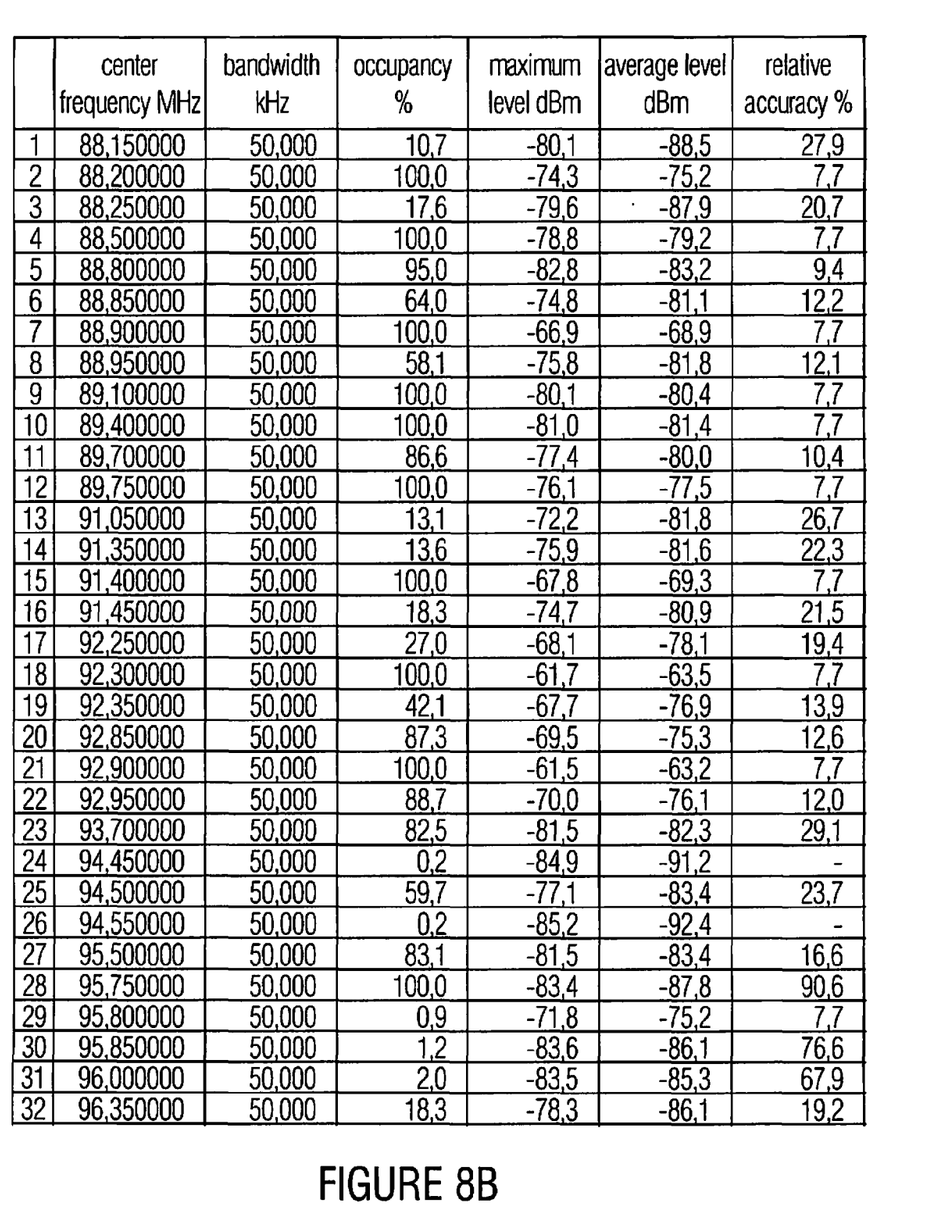

FIGS. 8a, b show an exemplary configuration as can be used, for example, within a computer program for spectral occupancy measurement. Hence, the computer program can control and monitor a measurement system for spectral occupancy measurement.

As is shown in FIG. 8a, exemplarily, the frequency range of 88.1 MHz to 107.5 MHz is measured with a channel bandwidth of 50 kHz. Additionally, the frequency of 100 MHz has been measured with a channel width of 100 kHz, wherein the frequency range between 90 MHz and 91 MHz was excluded from the measurement. In this measurement, the offset of 10 dB was set, and the overall measuring time was 2 hours, wherein one statistic each has been calculated at 2-minute intervals.

FIG. 8b shows the result of the measurement after 3 minutes and 44 seconds for the 369 channels to be measured, for which one statistic each has been calculated. It was shown, for example, that the frequency of 89.7 MHz at a bandwidth of 50 kHz is occupied with a relative accuracy of ±10.4% to 86.6%. In the course of the overall measuring time (2 hours), the relative accuracy decreases across this channel, so that the measuring result approximates more and more the actual channel occupancy. The relative accuracy can also be determined, for example, by common statistical methods, wherein, as has been mentioned, FIG. 8b merely shows a first intermediate result of the measurement system for spectral occupancy measurement.

In further practical implementations of the inventive NRT algorithm, the parameters can, for example, be selected as follows: startb2=8 kHz, startfreq=9 kHz, endfreq=3 GHz, geofac=1,01, averaging=4 . . . 32, noisefac=5%, offset=5 dB and an FFT length of 4096. However, these are merely exemplary values that can be changed in further embodiments.

Further, in further embodiments of the inventive NRT algorithm, the same can be used in connection with a statistic evaluation for realizing an exact measurement method for determining the spectral occupancy. For the statistical evaluation, for example methods can be used as are disclosed in Spaulding, A. D.; Hagn, G. H.: On the Definition and Estimation of Spectrum Occupancy, IEEE Transactions, Vol. EMC-19, No. 3, August 1977.

Embodiments of the present invention can also be summarized as follows. They include a method for frequency-selective occupancy measurement based on a threshold determined from the noise floor, characterized for example in that several NRT nodes or node frequencies 115 are used for calculating the threshold (NRT). Further, thereby, the node frequencies 115 (the frequencies of the NRT nodes underlying the NRT) can be flexibly adapted to real conditions based on different parameters. The adaptation can be made, for example, with regard to minimizing the error rate. Additionally, the node frequencies 115 can be flexibly adapted to real conditions based on a geometric series. In embodiments, it is further possible to interpolate the determined power levels (level values 125 at node frequencies 115) of the NRT nodes. Thereby, the level values 125 at the node frequencies 115 can be interpolated, for example, based on a cubic spline or constrained cubic spline interpolation.

In further embodiments, the NRT raster can be adapted to the current receive spectrum (receive level values 127). The adaptation to the current receive spectrum can be realized, for example, by a frequency shift and adaptation of the growth factor. The frequency shift and the adaptation of the NRT raster to the current receive spectrum can be realized, for example, by a locally modified factor of the geometric series. Further, embodiments comprise a method whereby the NRT raster is adapted to the current receive spectrum by a frequency shift and adaptation of the factor of the geometric series based on an approximation of the Newton method.

In particular, it should be noted that, depending on the circumstances, the inventive scheme could also be implemented in software. The implementation can be made on a digital memory medium, in particular a disc or a CD having electronically readable control signals that can cooperate with a programmable computer system such that the respective method is executed. It follows that the invention generally consists in a computer program product having a program code stored on a machine-readable carrier for performing the inventive method when the computer program product runs on a computer. In other words, the invention can be realized as a computer program having a program code for performing the method when the computer program runs on a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Apparatus for frequency-selective occupancy detection of a channel in a frequency band, comprising:
    a detector for detecting a power spectrum density PSD in the frequency band;
    a provider for providing node frequencies for a threshold curve with respect to a noise floor in the frequency band;
    a determiner for determining node power levels at the node frequencies based on receive power levels of the power spectrum density, wherein the determiner for determining node power levels is implemented to integrate a previously determined node power level into the determination of a node power level currently to be determined such that heavily varying node power levels are attenuated;
    a determiner for determining the threshold curve in the frequency band based on the provided node frequencies and on the node power levels at the node frequencies; and
    a comparer for comparing a current power of the receive power levels in the channel with a reference power in the channel predetermined by the threshold curve, for determining, in dependence on the comparison, an occupancy or non-occupancy of the channel.

2. Apparatus according to claim 1, wherein the detector is implemented to detect the power spectrum density several times within time intervals.

3. Apparatus according to claim 1, wherein the provider for providing the node frequencies is implemented to change a difference of adjacent node frequencies with increasing frequency in the frequency band by a factor of change.

4. Apparatus according to claim 3, wherein the difference of adjacent node frequencies increases with increasing frequency in the frequency band.

5. Apparatus according to claim 1, wherein the frequency band comprises an initial and a terminal frequency, and wherein the provider for providing the node frequencies is implemented to select adjacent node frequencies such that a first node frequency corresponds to the initial frequency, and a last node frequency corresponds to the terminal frequency within a tolerance range.

6. Apparatus according to claim 5, wherein the provider for providing node frequencies is implemented to match the first node frequency with the initial frequency and the last node frequency with the terminal frequency by means of the Newton method.

7. Apparatus according to claim 1, wherein the provider is implemented to take the node frequencies for the frequency band from a table.

8. Apparatus according to claim 1, wherein the determiner for determining node power levels is implemented to determine the node power levels based on successive receive power levels.

9. Apparatus according to claim 8, wherein the determiner for determining node power levels is implemented to form a histogram from the successive receive power levels and to further determine the node power levels by a lower power level limit in the histogram.

10. Apparatus according to claim 1, wherein the determiner for determining node power levels is implemented to form a histogram from successive receive power levels, and to further determine the node power levels by a power level with a specific distance to a lower power level limit.

11. Apparatus according to claim 1, wherein the determiner for determining node power levels is implemented to average successive receive power levels and to further use an averaging result as new receive power level.

12. Apparatus according to claim 1, wherein the determiner for determining the node power levels comprises a leaky integrator and the leaky integrator is implemented to acquire the attenuation.

13. Apparatus according to claim 1, wherein the determiner for determining the threshold curve is implemented to determine the threshold curve by interpolation between the node power levels at the node frequencies.

14. Apparatus according to claim 13, wherein the interpolation comprises linear interpolation or cubic interpolation or constrained cubic interpolation.

15. Apparatus according to claim 1, wherein the determiner for determining the threshold curve is implemented to add an offset in the determination of the threshold curve, so that the threshold curve comprises an offset distance to the noise floor.

16. Apparatus according to claim 1, wherein the comparer is implemented to classify the channel as occupied when the current power of the receive power levels is higher than the reference power of the threshold curve.

17. Apparatus according to claim 1, wherein the comparer is implemented to determine an average value of the current power in the channel and an average value of the reference power in the channel, and to classify the channel as occupied when the average value of the current power is above the average value of the reference power.

18. Method for frequency-selective occupancy detection of a channel in a frequency band, comprising:
 detecting a power spectrum density in the frequency band;
 providing node frequencies for a threshold curve with respect to a noise floor in the frequency band;
 determining node power levels at the node frequencies based on receive power levels of the power spectrum density, wherein the determining node power levels comprises integrating a previously determined node power level into the determination of a node power level currently to be determined such that heavily varying node power levels are attenuated;
 determining the threshold curve in the frequency band based on the provided node frequencies and on the node power levels at the node frequencies; and
 comparing a current power of receive power levels in the channel with a reference power in the channel predetermined by the threshold curve, in order to detect an occupancy or non-occupancy of the channel based on the comparison.

19. Method according to claim 18, wherein providing the node frequencies is performed such that a difference of adjacent node frequencies increases with increasing frequency in the frequency band by a factor of change.

20. Method according to claim 18, wherein the frequency band comprises an initial and a terminal frequency, and wherein providing the node frequencies is performed such that a first node frequency corresponds to the initial frequency and a last node frequency to the terminal frequency within a tolerance range.

21. Method according to claim 18, wherein determining node power levels further comprises forming a histogram of successive receive power levels, and further determining the node power levels by a power level with a certain distance to a lower power level limit.

22. Method according to claim 18, wherein determining the threshold curve further comprises interpolating between the node power levels, so that the threshold curve is determined by the interpolation.

23. Method according to claim 18, wherein comparing further comprises determining an average value of the current power in the channel and, further, of a further average value of the reference power in the channel, and the channel is classified as occupied when the average value of the current power is above the further average value of the reference power.

24. A non-transitory computer-readable medium comprising a program code for causing a computer to perform a method for frequency-selective occupancy detection of a channel in a frequency band, the method comprising:
 detecting a power spectrum density in the frequency band;
 providing node frequencies for a threshold curve with respect to a noise floor in the frequency band;
 determining node power levels at the node frequencies based on receive power levels of the power spectrum density, wherein the determining node power levels comprises integrating a previously determined node power level into the determination of a node power level currently to be determined such that heavily varying node power levels are attenuated;
 determining the threshold curve in the frequency band based on the provided node frequencies and on the node power levels at the node frequencies, and
 comparing a current power of receive power levels in the channel with a reference power in the channel predetermined by the threshold curve, in order to detect an occupancy or non-occupancy of the channel based on the comparison.

* * * * *